Jan. 22, 1957
C. P. BECK ET AL
2,778,184
MECHANICAL FRUIT PICKER
Filed July 26, 1955
2 Sheets-Sheet 1
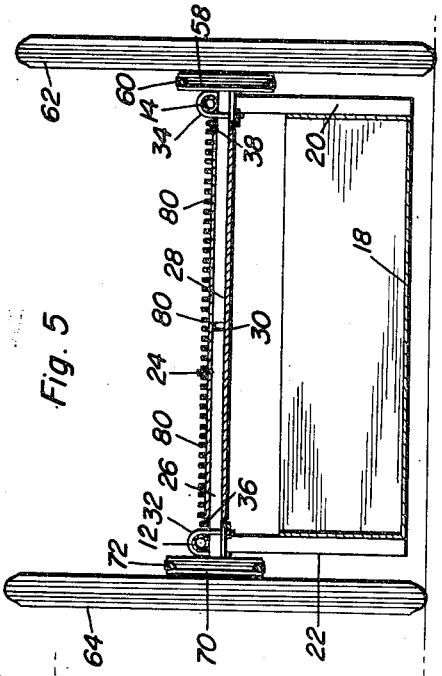
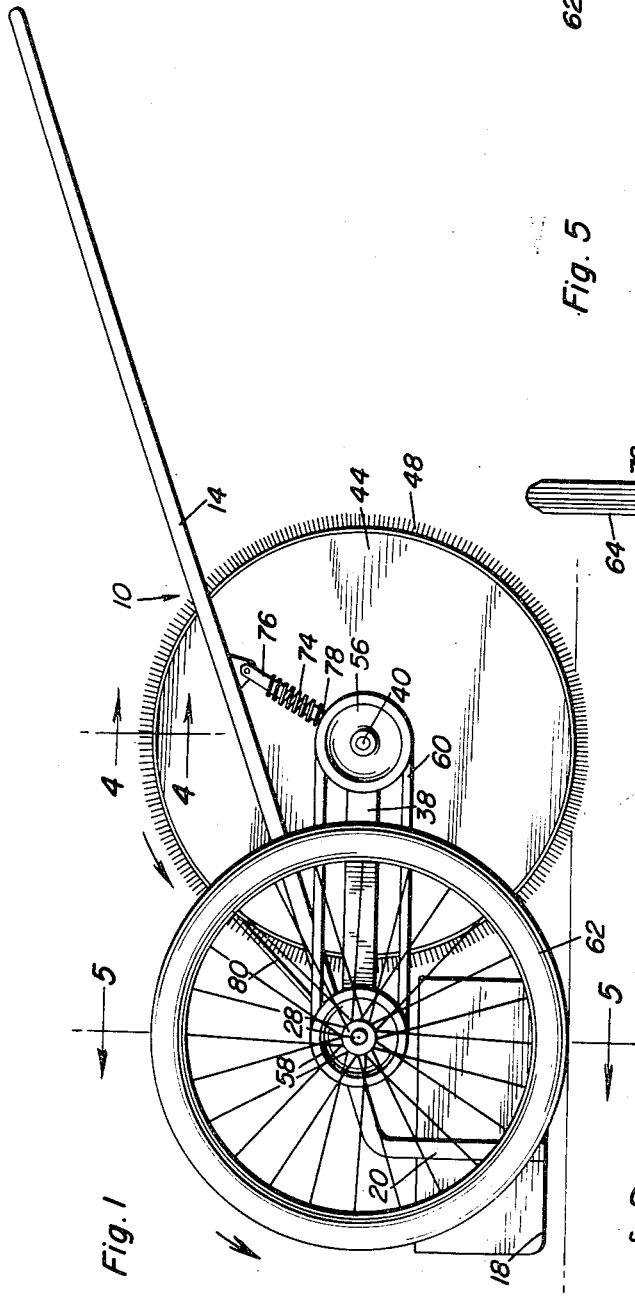
Carl P. Beck
Joseph E. Roesbery
INVENTORS Jan. 22, 1957   C. P. BECK ET AL   2,778,184
MECHANICAL FRUIT PICKER
Filed July 26, 1955   2 Sheets-Sheet 2
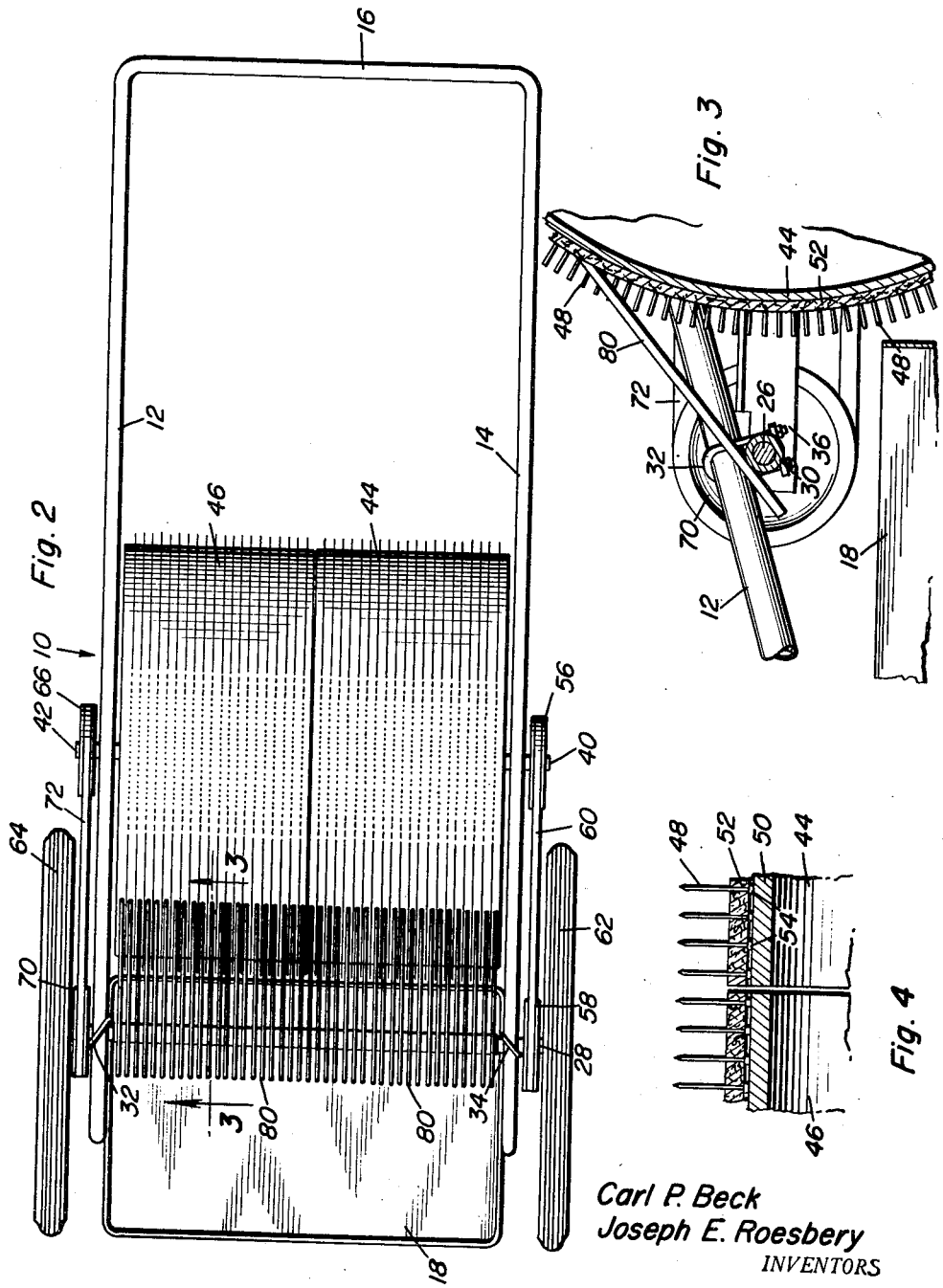
Carl P. Beck
Joseph E. Roesbery
INVENTORS United States Patent Office 2,778,184
Patented Jan. 22, 1957

2,778,184

MECHANICAL FRUIT PICKER

Carl P. Beck, Oceano, and Joseph E. Roesbery, Raymond, Calif.

Application July 26, 1955, Serial No. 524,383

4 Claims. (Cl. 56—328)

This invention relates to fruit gatherers, and particularly to machines for picking up fruit such as prunes, nuts and figs from the ground after the fruit has been shaken or otherwise separated from the tree.

An object of this invention is to provide a fruit gathering machine of the type adapted to be moved by a walking attendant, the machine having an improved structural arrangement involving two or more drums which are rotatable at speeds proportional to the forward velocity of the vehicle and which gather the fruit by piercing the same and transporting it to a stripping station wherein combination strippers and guides lead the fruit from the drums into a container.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side view of the fruit gatherer embodying the principles of the invention;

Figure 2 is a top view of the machine in Figure 1;

Figure 3 is an enlarged sectional view taken substantially on the line 3—3 of Figure 2 and in the direction of the arrows;

Figure 4 is a fragmentary enlarged sectional view taken substantially on the line 4—4 of Figure 1 and in the direction of the arrows; and Figure 5 is a sectional view taken substantially on the line 5—5 of Figure 1 and in the direction of the arrows.

In the accompanying drawings, the fruit and nut gathering machine 10 depicts one embodiment of the invention. This machine comprises a handle having two parallel sides 12 and 14 together with a handgrip cross member 16 at one end and a fruit gathering box supporting base 18 extending across and secured to the opposite ends of said sides 12 and 14. This base is welded or otherwise rigidly secured to the depending ends 20 and 22 of said sides 12 and 14, respectively.

An axle assembly 24 extends across the sides 12 and 14 and comprises a pair of spindles 26 and 28 mounted for rotation in a sleeve 30. Handle side 12 is rotatively connected to spindle 26 by suitable means, as bearing 32, and the side 14 of the handle is connected to the outer end of spindle 28 by suitable means, as bearing 34. Arms 36 and 38, respectively, are mounted for rotation on the outer ends of spindles 26 and 28, and these arms extend rearwardly of the machine and support shafts 40 and 42 respectively.

Individual drums 44 and 46 are secured to the shafts 40 and 42, and each drum is provided with a number of rows of pins 48, each row extending circumferentially around its drum. The purpose of the pins is to pierce the fruit and engage it in the gathering operation. The specific construction of each drum consists of a generally cylindrical shell as at 50 (Figure 4), around which a cylindrical band of flexible material 52, as leather, fabric, or other types of belting material. The pins have heads 54 disposed between the inner surface of the cylindrical layer of material 52 and the outer surface of the cylindrical drum 50. Accordingly, pins 48 which pierce the layer of fabric 52 are held in place on the drum but are capable of being flexed a limited amount when necessary.

The means for rotating the drums are identical. For the drum 44 there are pulleys 56 and 58 secured respectively to shaft 40 and spindle 28. Belt 60 is entrained around these pulleys. A wheel 62 is secured to the spindle 28, and an additional wheel 64 is secured to the spindle 26. For the drum 46, there are pulleys 66 and 70 secured respectively to the shaft 42 and the spindle 26, together with a belt 72 which drivingly connects the pulleys 66 and 70. In actuation, when the walking attendant pushes the handgrip cross member 16 of the handle, the support wheels 62 and 64 for the machine rotate, thereby rotating drums 44 and 46 through the pulleys and belts described herein.

In order to maintain proper pressure of the drums 46 and 44 on the ground, especially when the drums are moved over obstacles, as mounds, tree roots and stones, there is a spring 74 (Figure 1) for each of the drum-supporting shafts. The spring is secured at one end to a side of the handle and at the other end to the adjacent drum-supporting shaft through the use of appropriate mounting brackets and spring-supporting pins 76 and 78 respectively.

As the machine is moved forwardly under a fruit tree to gather the fruit that is on the ground, drums 44 and 46 rotate through the drive connection described previously. The pins pierce the fruit as they ride over it and carry it in a circular path to a fruit stripping station adjacent to the front of each drum. This station has a row of combined strippers and guides 80 for the fruit, the inner ends thereof being disposed between the rows of pins 48. As the drums rotate in their travel, the strippers 80 separate it from the drums and provide a ramp (see Figure 2) down which the fruit may travel in order to be deposited by gravity into the fruit box on fruit box support 18. When the fruit box is filled, it is separated from the machine and an empty one placed therein for subsequent fruit gathering operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fruit gathering machine of the type adapted to be pushed by a walking attendant, said machine comprising a handle which includes a pair of sides, an axle assembly having a pair of spindles and connected to said sides, a pair of drums having fruit piercing pins arranged in circumferential rows on said drums, support arms rotatably disposed on said axle assembly and supporting said drums for swinging movement about said axle assembly and rearwardly thereof, a plurality of fruit strippers carried by said axle assembly and having ends disposed between said rows of pins, a fruit container disposed below and in advance of said frame and in line with the opposite ends of said strippers to accept the fruit that is stripped from said drums, a fruit container supporting base connected to the forward ends of said sides of said handle, and means including machine support wheels on said spindles for rotating said drums at a speed proportional to the forward speed of the machine.

2. The fruit gathering machine of claim 1 and means including a spring reacting on each of said arms and said handle sides to maintain said drums under a constant spring load directed groundward.

3. A fruit gathering machine of the type which is adapted to be propelled by a walking attendant, said machine comprising a handle having a pair of sides and a hand grip cross-member, each of said sides having a depending end, a fruit gathering box supporting base extending across and secured to said depending ends, an axle assembly carried by said sides and located between said depending ends and said handle grip cross-member, said axle assembly including a sleeve, means fastening said sleeve onto said handle sides, a pair of ground-contacting wheels, spindles constituting a part of said axle assembly and disposed in said sleeve, said wheels being mounted on said spindles, a shaft located below said handle sides, a fruit gathering drum mounted for rotation on said shaft, a plurality of spaced circumferentially extending rows of pins protruding from said drum, a cylindrical band of flexible material on said drum through which said pins protrude, means connected to said spindles and said shaft for rotating said drum in response to the forward motion of the machine, a pair of arms mounted rotatively on said spindles and extending rearwardly, said arms being connected rotatively to said shaft, thereby holding said shaft and drum located rearwardly of said axle assembly, a fruit gathering box on said supporting base and located below and in advance of said axle assembly, and a stationary row of combined strippers and guides, said combined strippers and guides being fixed to said sleeve and being located between the circumferentially spaced rows of pins on said drum, the ends of combined strippers and guides being above said box in order to discharge the fruit stripped from said drum into said box.

4. The machine of claim 3 wherein each of said pins has a shank and a head, the head of each pin being located between the outer surface of said drum and the inner surface of said cylindrical band.

References Cited in the file of this patent
UNITED STATES PATENTS

| Number | Name | Date |
|---|---|---|
| 62,623 | Frantz | Mar. 5, 1867 |
| 436,935 | Corwin | Sept. 23, 1890 |
| 1,104,431 | Lint | July 21, 1914 |
| 1,136,249 | Lint | Apr. 20, 1915 |
| 1,439,266 | Shaw | Dec. 19, 1922 |
| 1,476,207 | Lint | Dec. 4, 1923 |
| 1,650,796 | Kellogg | Nov. 29, 1927 |
| 2,365,540 | Fonken | Dec. 19, 1944 |
| 2,573,210 | Madsen | Oct. 30, 1951 |